United States Patent [19]

Tanaka et al.

[11] Patent Number: 5,054,084
[45] Date of Patent: Oct. 1, 1991

[54] SYLLABLE RECOGNITION SYSTEM

[75] Inventors: Atsuo Tanaka, Mie; Shin Kamiya, Nara, both of Japan

[73] Assignee: Sharp Kabushiki Kaisha, Osaka, Japan

[21] Appl. No.: 524,663

[22] Filed: May 15, 1990

Related U.S. Application Data

[63] Continuation of Ser. No. 376,214, Jun. 29, 1989, abandoned, which is a continuation of Ser. No. 291,380, Dec. 23, 1988, abandoned, which is a continuation of Ser. No. 34,089, Apr. 2, 1987, abandoned.

[30] Foreign Application Priority Data

Apr. 5, 1986 [JP] Japan .................................. 61-78817

[51] Int. Cl.⁵ .............................................. G10L 5/06
[52] U.S. Cl. ...................................................... 381/43
[58] Field of Search ...................................... 381/41-46; 364/513.5

[56] References Cited

U.S. PATENT DOCUMENTS

| | | | |
|---|---|---|---|
| 4,581,756 | 4/1986 | Togawa et al. | 381/43 |
| 4,625,287 | 11/1986 | Matsuura et al. | 364/513.5 |
| 4,665,548 | 5/1987 | Kahn | 381/43 |
| 4,723,290 | 2/1988 | Natanabe et al. | 381/43 |
| 4,799,261 | 1/1989 | Lin et al. | 364/513.5 |

FOREIGN PATENT DOCUMENTS 0109140 5/1984 European Pat. Off. ............. 381/43
58-55995 4/1983 Japan .

*Primary Examiner*—Gary V. Harkcom
*Assistant Examiner*—John A. Merecki
*Attorney, Agent, or Firm*—Flehr, Hohbach, Test, Albritton & Herbert

[57] ABSTRACT

Syllables are recognized in voice data obtained from an input voice signal. Character arrays are used to represent the types and time frames of syllables with which the voice data are compared.

8 Claims, 3 Drawing Sheets

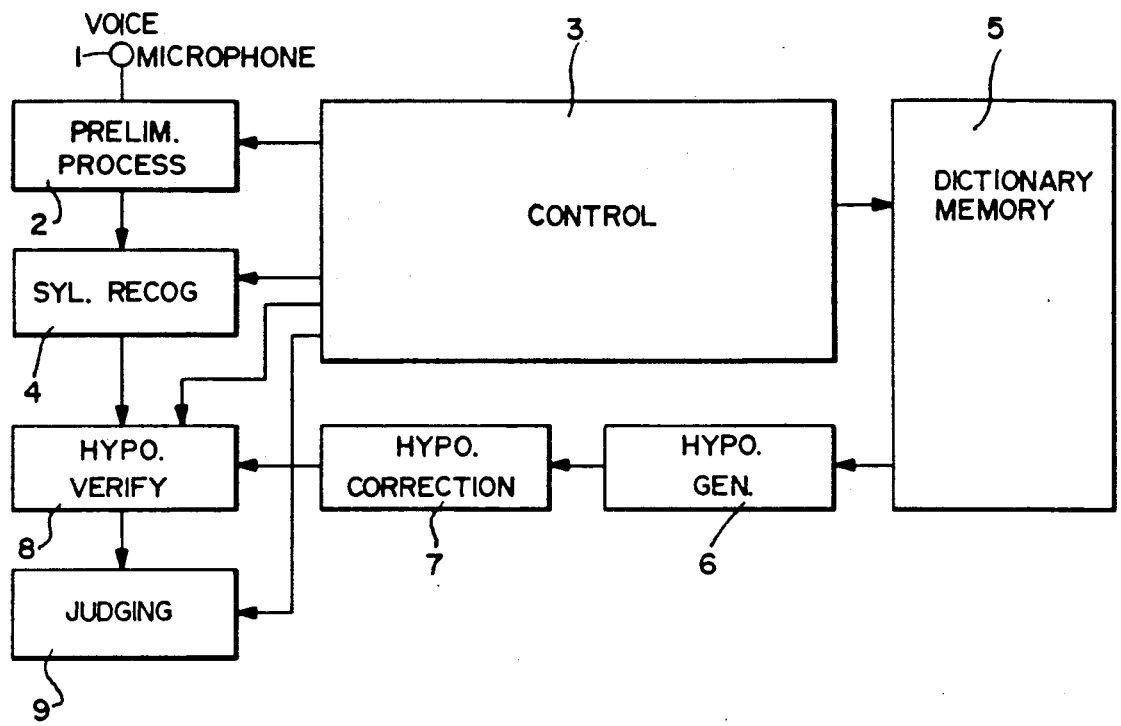
FIG.—1
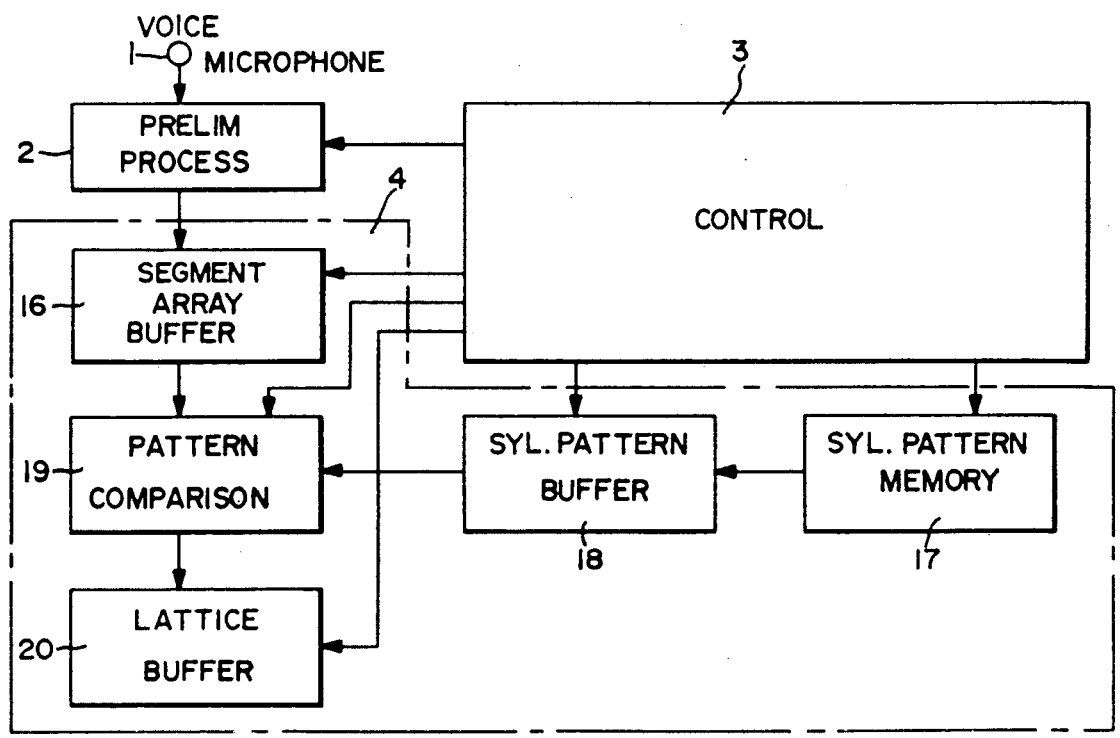
FIG.—3

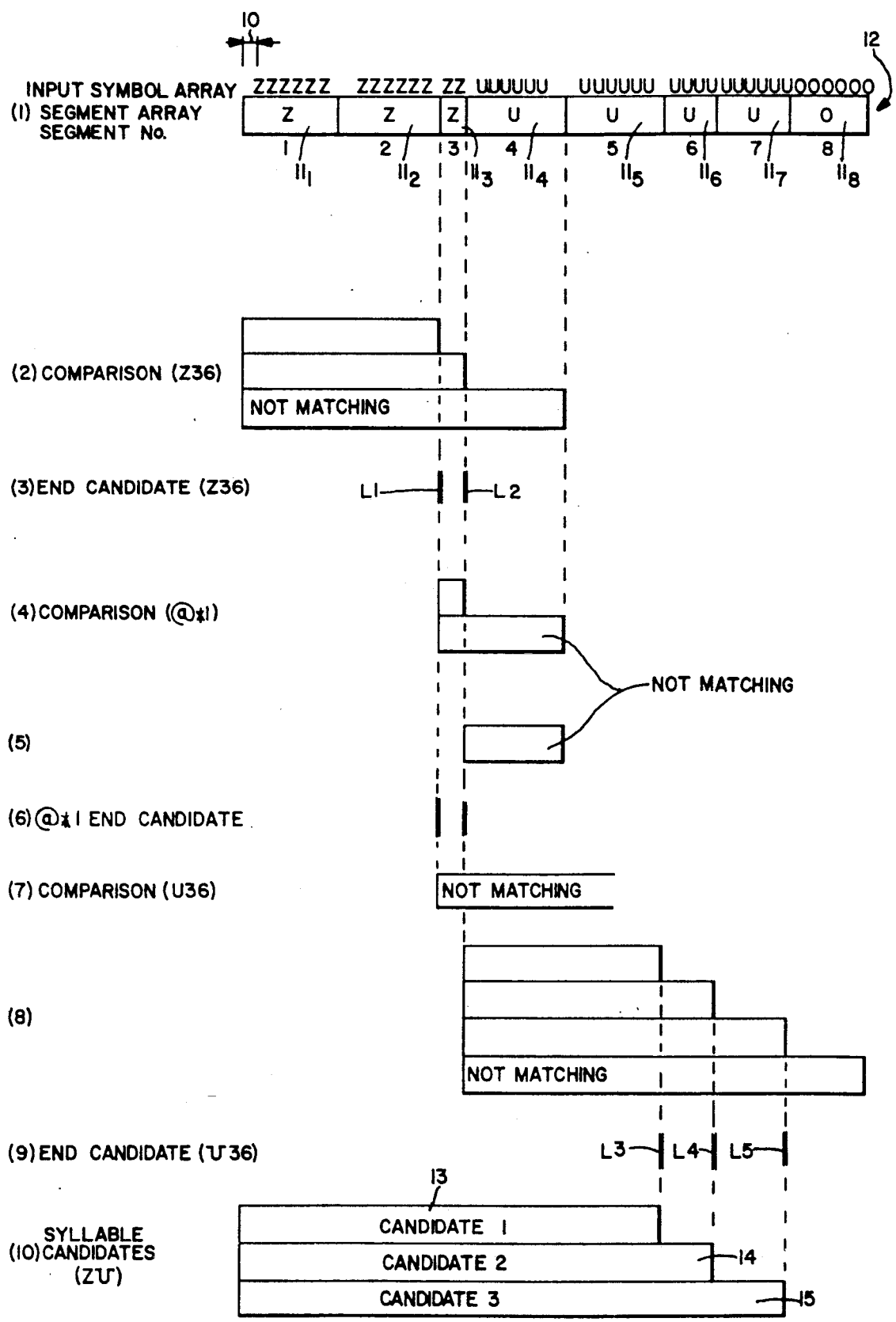
FIG.—2

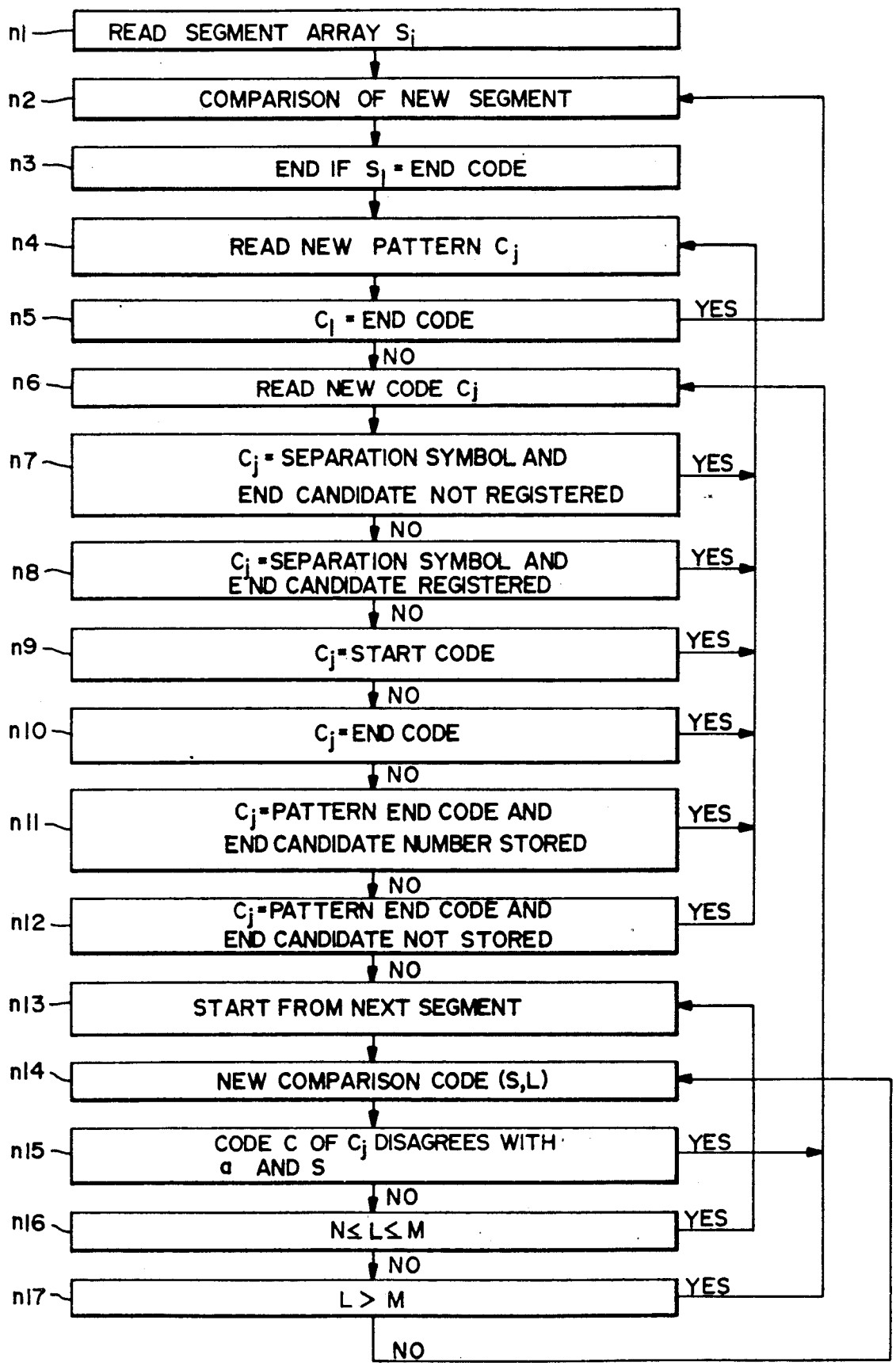
FIG.—4

SYLLABLE RECOGNITION SYSTEM

This is a continuation of application Ser. No. 376,214 filed June 29, 1989, now abandoned, which is a continuation of application Ser. No. 291,380 filed Dec. 23, 1988, and now abandoned, which is a continuation of application Ser. No. 034,089 filed Apr. 2, 1987, and now abandoned.

BACKGROUND OF THE INVENTION

This invention relates to a syllable recognition system for devices such as voice word processors which can identify input voice signals and display their contents, for example, on a cathode ray tube.

Continuous voice signals are difficult to analyze because vowels and consonants are frequently distorted, contracted or even dropped, depending on the speaker's habit, context, dialect and other factors. In short, there are many types of variations in the signals themselves. In order to properly analyze a continuous voice signal, therefore, it is necessary to incorporate into the syllable recognition system as much knowledge as possible of such distortions, or phonological variations.

Prior art voice recognition devices generally accept words, phrases and sentences in phonologically fixed forms. Accordingly, the speaker must accurately pronounce each syllable in order to be correctly understood.

SUMMARY OF THE INVENTION

It is therefore an object of the present invention to eliminate the aforementioned disadvantages of conventional method of recognizing syllables in a voice signal by providing a new syllable recognition system which incorporates the knowledge of phonological effects on the neighborhood of each syllable to be analyzed.

The present invention therefore relates to a method of and apparatus for identifying syllables in a voice signal characterized in that the syllable types and time frames of each syllable corresponding to an input voice signal are expressed as character arrays.

More in detail, when input voice signals are analyzed and the data obtained by the analysis are used to identify syllables, the syllable types and time frames of the individual syllables are each expressed as a character array. Since syllables are thus expressed in the form of a character array, voice phenomena become easier to recognize and the knowledge of phonological effects on the neighborhood of each syllable becomes easier to capture and express. Since comparisons of syllables with standard patterns can now be effected by considering the neighborhoods in which they appear, candidate syllables can be selected more accurately. Additional advantages of the present invention are that the required memory per standard pattern becomes reduced because of the character array representation, that the time required for comparisons of syllables can be reduced, and that more syllable patterns can be stored. As a result, more knowledge of phonological variations of each syllable can be actively utilized and hence the system capability can be improved.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings:

FIG. 1 is a block diagram showing the basic structure of an apparatus for voice recognition embodying the present invention, FIG. 2 is a drawing for showing how input syllables are analyzed according to the present invention, FIG. 3 is a block diagram showing the structure of a syllable recognition unit embodying the present invention, and FIG. 4 is a flow chart of the comparison process according to the present invention.

DETAILED DESCRIPTION OF THE INVENTION

With reference to FIG. 1 which is a block diagram of an apparatus for voice recognition embodying the present invention, an input voice signal is received through a microphone 1 by a preliminary processing unit 2 where it is analyzed under the control of a control unit 3, for example, by using cepstrum coefficients. The output from the preliminary processing unit 2 is received by a syllable recognition unit 4 where it is tentatively recognized in units of syllables. A collection of data on syllables thus recognized, hereinafter referred to as a syllable lattice because it is often displayed for explanation in the form of a lattice as will be described more in detail below, is outputted from the syllable recognition unit 4. In the meantime, a hypothesis generating unit 6 generates hypothetical syllable descriptions corresponding to each one of the syllables by considering the syllable lattice and referencing a dictionary 5.

Hypothetical syllable arrays obtained by combining these hypothetical syllable descriptions are corrected in a hypothesis correcting unit 7 according to predefined rules. A hypothesis verifying unit 8 is provided to examine whether such corrected hypothetical syllables are found in the syllable lattice and to obtain a score for the hypothesis as will be explained below for evaluating the hypothesis. A judging unit 9 serves to determine the reliability of the hypothesis on the basis of the score.

According to the present embodiment of the invention, an input voice signal is converted into a time array of phonologically characterized segments as will be explained below. A syllable lattice is created by a matching process with syllable patterns described by character arrays. The present invention relates to the syllable recognition unit 4 of FIG. 1, and to the process of creating a syllable lattice. For example, hypothetical syllable arrays generated according to a predefined rule from terms stored in the dictionary 5 are considered in view of the syllable lattice obtained by a process of the present invention and evaluated by calculating their scores.

When an input voice signal is received by the preliminary processing unit 2 through a microphone 1 or the like, its bandwidth is limited according to the frequency band to be used (for example, by cutting off the portion above 8kHz), the signal is sampled and then converted into a digital signal (quantized, for example, to 12 bits for 16 kHz). The digital signal is thereafter analyzed within time windows of about 10-40 ms with appropriate time intervals (frames) such as 4-20 ms.

Analysis of the input voice signal may be effected by any known method such as the linear predictive coding and cepstrum analysis. Characterization may be effected, for example, by using rough categories such as nasal, vowel, weak fricative, strong fricative, voice fricative, etc. and by matching with preregistered standard patterns corresponding to voice elements represented by phonetic symbols. For application to the Japanese language, use may be made of 18 phonetic symbols including five vowels A, I, U, E and O and consonants such as S, H, K, N, M and R from the Japanese alphabet.

An input voice signal is divided into segments of appropriate length such as 20-100 ms. In FIG. 2, numeral 12 indicates an example of input voice signal divided into segments $11_1, 11_2, \ldots 11_8$. Symbols "Z", "O" and "U" represent the types of sound corresponding to each frame 10. Segmentation may be effected not only where the symbol changes but also by considering a change in the general characteristics of the input signal. In the example illustrated in FIG. 2, a boundary between segments is introduced whenever the same symbol continues for seven or more frames.

Voice recognition is effected by using the segment array 12 obtained from an input voice signal as described above and by matching it with syllable patterns expressed in a descriptive form such as a character array. Examples of patterns for syllables "ZU", "KA" and "KI" are shown in Table 1 wherein reliability coefficient S is a measure of how reliably the pattern represents the corresponding syllable. Reliability being small means that a smaller penalty is imposed in calculating the score as will be explained below. The number which appears after each phonetic symbol (such as 36 after Z) corresponds to the length of time of the segment, "1" indicating two to three frames, "2" indicating four to six frames, "3" indicating seven to ten frames, "4" indicating eleven to fourteen frames and, in general, "n" indicating $(n^2+n+2)/2$ to $(n^2+3n+2)/2$ frames. Thus, "U24" indicates that the phonetic syllable is "U" and that its length is from "2" to "4" or from four to fourteen frames. "@" indicates an arbitrary phonetic symbol. "*" indicates a null frame, or it shows that the segment 11 may be dropped. The () indicate the boundaries of a syllable segment, "(" indicating the beginning of a syllable and ")" its end. Each space inside a syllable pattern corresponds to a symbol for separating segments 11. The first line of Table 1, therefore, indicates a segment array with segments $11_1$ to $11_3$ of 7 to 28 frames with phonetic symbol Z followed by a segment of zero to three frames which is further followed by segments $11_4-11_7$ of 7 to 28 frames with phonetic symbol U. In the third line of Table 1, "." indicates a silent voice. The fourth line indicates that the Japanese phonetic syllable "KA" is sometimes pronounced with "O" or "U" inserted before "A" if "KA" is preceded by "O".

TABLE 1

| Syllable Symbol | Reliability S | Syllable Pattern |
|---|---|---|
| (1) ZU | 1 | (Z36 @*1 U36) |
| (2) ZU | 2 | (Z23 @*2 U26) |
| (3) ZU | 2 | (Z46 @*1) .19 |
| (4) KA | 3 | 0.26 .24 (K12 O24 U24 A26) |
| (5) KI | 3 | .19 (C36) S36 |

Comparison between an input segment array 12 and a syllable pattern is effected by comparing each segment 11 of the syllable pattern sequentially with the segment array 12 obtained from an input voice signal. Let us consider an example of comparing the input segment array 12 in FIG. 2 with the syllable pattern for ZU on the first line of Table 1. The existence of "(" (in Table 1) indicates that the first segment $11_1$ is the beginning of the syllable. Next, since the segment array "Z36" has the length of 7-28 frames, this may correspond to the sum of the first and second segments $11_1$ and $11_2$ of the input segment array 12 as well as to the sum of the three segments $11_1, 11_2$ and $11_3$. If the fourth segment $11_4$ is included in the sum, however, there appears the phonetic symbol U and this is why "no matching" is shown at (2) in FIG. 2. Thus, possible (candidate) end positions of the segment "Z36" are L1 and L2 as shown at (3) in FIG. 2.

The next comparison with the segment "@*1" starts from a candidate end position (referred to as "end candidate" in FIG. 2) of the segment "Z36" which has just been matched. In other words, each candidate end position of a preceding segment becomes a candidate starting position of the succeeding segment. Since there are two candidate starting positions L1 and L2 for "@*1" in this example, comparisons are made as shown in (4)-(6) of FIG. 2 for each candidate position. Comparisons are similarly made regarding the segment "U36" as shown in (7)-(8) of FIG. 2 and, as a result, three candidate end positions L3, L4 and L5 are obtained as shown in (9) of FIG. 2. Since there is ")" in Table 1, these three candidate end positions L3, L4 and L5 are also considered as candidate syllable boundary positions. Since there is no more segment to be compared in this syllable pattern, it is then concluded that the comparison with the syllable pattern for "ZU" was successful and, as shown at (10) in FIG. 2, three candidate syllables 13 (from the first segment $11_1$ to the fifth segment $11_5$), 14 (from the first segment 111 to the sixth segment $11_6$), and 15 (from the first segment $11_1$ to the seventh segment $11_7$) are obtained.

Such comparisons with syllable patterns are repeated for each segment. Data related to each of the candidate syllables 13-15 such as its score and position are conveniently represented in a lattice-like form. A collection of such data is therefore referred to as the syllable lattice, or simply as the lattice. The aforementioned score D is a function of reliability S and can be expressed simply as D = FS where F is a weight coefficient.

As shown in FIG. 3, the syllable recognition unit 4 includes, according to one embodiment of the present invention, a segment array buffer 16 for storing a segment array obtained by the preliminary processing unit 2, a syllable pattern memory 17 for storing syllable patterns, a syllable pattern buffer 18 for storing a syllable pattern retrieved from the aforementioned syllable pattern memory 17 under the control of the control unit 3, a syllable pattern comparison unit 19 for comparing the segment array 12 with a syllable pattern, a syllable lattice buffer 20 for the syllable lattice, that is, for accumulating and storing the results of such comparisons.

The aforementioned comparison process with a syllable pattern is explained next with reference to the flow chart shown in FIG. 4. As explained above by way of FIG. 2, the segment array 12 received from the preliminary processing unit 2 (in Step n1) is comprised of a code array $S_i$ where $i = 1, 2, \ldots L_s$, $L_s$ being the total number of codes in the segment array. Each code $S_i$ may represent, for example, one of the aforementioned segments 11, a symbol indicating a separation between segments, or an end code. Each syllable pattern received from the syllable pattern memory 17 is also comprised of a code array which will be written as $C_j$ where $j = 1, 2, \ldots L_c$, $L_c$ being the total number of the codes in the syllable pattern. Each code $C_j$, likewise, may be a segment code, a syllable start code (corresponding to the symbol "("), a syllable end code (corresponding to the symbol ")"), a symbol indicating a separation between segments (corresponding to the space symbol), a pattern end code or a pattern memory end code.

Each segment code in the segment array 12 may be a symbol (shown by "S" in FIG. 4) which characterizes the segment 11 or the frame length of the segment 11 (shown by "L" in FIG. 4). Each segment code in a syllable pattern, likewise, may be a symbol (shown by "C" in FIG. 4) which characterizes the segment 11, the minimum allowable frame length of the segment (shown by "N" in FIG. 4) or the maximum allowable frame length of the segment 11 (shown by "M" in FIG. 4).

In Step n2, the segment where a comparison process is started (comparison starting segment) is updated. Thereafter (in Step n3), the process is finished if, for example, the code $S_1$ represented by the segment array comprised of the segments $11_1$–$11_3$ of FIG. 2(1) is the segment array end code. If the code $S_1$ does not represent the end of a segment array, a new syllable pattern $C_j$ is read from the syllable pattern memory 17 into the syllable pattern buffer 18 (n4). If the code $C_1$ in the syllable pattern code array $C_j$ is found to be a syllable pattern memory end code (YES in n5), the routine goes back to Step n2. If the code $C_1$ is not a syllable pattern memory end code, the code array $C_j$ is transferred from the syllable pattern buffer 18 into the pattern comparison unit 19 (n6).

If it is determined thereafter (n7) that the code $C_j$ is for separating segments and that no candidate segment end (such as L1–L5 in FIG. 2) is set and registered, this means that this segment has failed the comparison and the routine goes back to Step n4. If the code $C_j$ does not satisfy the condition for returning to Step n4, the routine proceeds to Step n8 where it is examined whether the code $C_j$ is for separating segments and the aforementioned candidate segment end is set and registered. If so (YES in Step 8), the routine returns to Step n4.

Results of a comparison include the syllable type, reliability coefficient, the starting segment number of candidate syllable, and its end segment number. Results of a comparison are cleared in Step n4. Thus, if there is no end segment number of a candidate syllable registered at the end of a comparison of a syllable pattern (n7), it means that the comparison was a failure. If the code $C_j$ does not satisfy the conditions for returning from Step n8 to Step n4, the routine proceeds to Step n9 where it is examined whether the code $C_j$ is the aforementioned syllable starting code. If so, the starting segment number of the syllable type to which this code $C_j$ belongs is retained and the routine returns to Step n6. If the code $C_j$ is not the aforementioned syllable starting code (NO in Step n9), it is examined next whether the code $C_j$ is the aforementioned syllable end code (n10). If so, the end candidate segment number of the syllable type to which this code $C_j$ belongs is likewise retained and the routine returns to Step n6. If not, the routine proceeds to step n11. If it is found in Step n11 that the code $C_j$ is the syllable pattern end code and that a syllable end candidate segment number is retained, it is concluded that the pattern comparison was successful and the results of comparison are transmitted to the syllable lattice buffer 20, the routine returning thereafter to Step n4. If the cord $C_j$ does not satisfy the conditions for returning from Step n11 to Step n4, the routine proceeds to Step n12. If it is found in Step n12 that the code $C_j$ is the syllable pattern end code and that there is retained no syllable end candidate segment number, it is concluded that the comparison was a failure and the routine returns to Step n4. If the code $C_j$ does not satisfy the conditions for returning from Step n12 to Step n4, the routine proceeds to Step n13 where the segment which is next after the segment end candidate becomes the comparison starting segment. Thereafter, a new comparison segment $S_i$ with segment code (S, L) is introduced (n14).

If the segment comparison fails between Steps n13 and n14, no segment end candidate is registered. Thus, the absence of registered segment end candidate at the completion of segment comparison means that the segment comparison was a failure.

If the comparison segment is updated in Step n14, the routine proceeds to Step n15 and, if (C, N, M) represents the segment code and the aforementioned code element C does not agree with the symbol "@" of Table 1 or the aforementioned code element "S", the routine returns to Step n6. If the code $C_j$ does not satisfy the conditions for returning from Step n15 to Step n6, the routine proceeds to Step n16 where it is examined whether the code elements N and M satisfy the condition $N \leq L \leq M$. If this condition is satisfied, the segment end candidate (such as L1–L5 shown in FIG. 2) is updated and the routine returns to Step n13. If L is greater than M (YES in Step n17), the routine returns to Step n6. If otherwise (NO in Step n17), the routine returns to Step n14.

In summary, the flow chart of FIG. 4 shows a procedure according to which each segment 11 of the segment array 12 obtained from an input voice signal is treated as a starting segment and sequentially compared with all syllable patterns. In other words, each starting segment is compared with all syllable patterns stored in the syllable pattern memory 17 (n5 or FIG. 4) and the starting position (or segment) is sequentially shifted (Step n2 of FIG. 4). Thus, it is at Step n3 where comparisons of all segments of a given segment array with all available syllable patterns are completed.

The apparatus and method of this invention are therefore characterized in that the syllable types and time frames of all syllables are expressed as character arrays. Since syllables are expressed as character arrays, voice signals become easier to capture and data related to the phonological effects in the neighborhood of each syllable become easier to express. Since a comparison can be made inclusive of the neighborhood of each syllable being considered, more reliable candidates can be obtained. Moreover, the memory capacity required for comparison can be reduced because character arrays are used and this further has the favorable effect of reducing the memory capacity required for each syllable pattern and the time required for a comparison of patterns. Since more variations of each syllable can be utilized in the analysis, this also results in improved capability of syllable recognition.

The foregoing description of a preferred embodiment of the invention has been presented for purposes of illustration and description. It is not intended to be exhaustive or to limit the invention to the precise form disclosed, and many modifications and variations are possible in light of the above teaching. Such modifications and variations that may be apparent to a person skilled in the art are intended to be included within the scope of this invention.

What is claimed is:

1. A method of recognizing syllables in an input voice signal comprising the steps of sequentially sampling an input voice signal at regular time intervals to obtain a series of sampled signals, comparing said sampled signals with standard phoneme patterns to phonetically characterize each of said sampled signals and assigning character symbols individually to said sampled signals to thereby obtain an array of said character symbols, said character symbols being each indicative of a phonological characteristic, obtaining an array of segments by partitioning said array of character symbols into segments, each of said segments containing at least one of said character symbols and having its length defined by the number of said character symbols contained therein, providing a collection of standard syllable patterns, each of said standard syllable patterns being identified as representing a syllable and comprising an array of character groups, each of said character groups including one of said character symbols and a range symbol indicating a range of duration, said range being specified as being between a minimum and a maximum, said minimum and maximum being selected from more than three predefined values, and assigning syllables to said array of segments by sequentially comparing said array of segments with both said character and range symbols of said standard syllable patterns.

2. The method of claim 1 wherein said range symbol includes a smaller one-digit integer n indicative of said minimum and a larger one-digit integer N indicative of said maximum.

3. The method of claim 2 wherein said minimum is given as a function of n as $(n^2+n+2)/2$ and said maximum is given as a function of N as $(N^2+3N+2)/2$.

4. The method of claim 1 wherein said character symbols include consonant symbols each representing a consonant and vowel symbols each representing a vowel.

5. An apparatus for recognizing syllables in an input voice signal comprising sampling means for sequentially sampling an input voice signal at regular time intervals to obtain a series of sampled signals, means for comparing said sampled signals with standard phoneme patterns to phonetically characterize each of said sampled signals and assigning character symbols individually to said sampled signals to thereby obtain an array of said character symbols, said character symbols being each indicative of a phonological characteristic, means for obtaining an array of segments by partitioning said array of character symbols into segments, each of said segments containing at least ne of said character symbols and having its length defined by the number of said character symbols contained therein, dictionary means containing a collection of standard syllable patterns, each of said standard syllable patterns being identified as representing a syllable and comprising an array of character groups, each of said character groups including one of said character symbols and a range symbol indicating a range of duration, said range being specified as being between a minimum and a maximum, said minimum and maximum being selected from more than three predefined values, and processing means for assigning syllables to said array of segments by sequentially comparing said array of segments with both said character and range symbols of said standard syllable patterns.

6. The apparatus of claim 5 wherein said range symbol includes a smaller one-digit integer n indicative of said minimum and a larger one-digit integer N indicative of said maximum.

7. The apparatus of claim 6 wherein said minimum is given as a function of n as $(n^2+n+2)/2$ and said maximum is given as a function of N as $(N^2+3N+2)/2$.

8. The apparatus of claim 5 wherein said character symbols include consonant symbols each representing a consonant and vowel symbols each representing a vowel.

* * * * *